United States Patent
Chiu

(10) Patent No.: US 10,257,335 B2
(45) Date of Patent: Apr. 9, 2019

(54) WRISTWATCH, MOBILE TERMINAL, AND COMMUNICATION REMINDING SYSTEM AND METHOD

(71) Applicant: PRINCO CORP., Hsinchu (TW)

(72) Inventor: Pei-liang Chiu, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 39 days.

(21) Appl. No.: 15/403,768

(22) Filed: Jan. 11, 2017

(65) Prior Publication Data

US 2018/0124228 A1    May 3, 2018

(30) Foreign Application Priority Data

Oct. 28, 2016   (TW) .............................. 105135065 A

(51) Int. Cl.
| | |
|---|---|
| H04M 1/725 | (2006.01) |
| H04M 1/2745 | (2006.01) |
| H04M 3/42 | (2006.01) |
| H04W 4/16 | (2009.01) |
| H04M 19/04 | (2006.01) |

(52) U.S. Cl.
CPC ..... *H04M 1/72522* (2013.01); *H04M 1/2745* (2013.01); *H04M 1/7253* (2013.01); *H04M 3/42059* (2013.01); *H04M 19/04* (2013.01); *H04W 4/16* (2013.01)

(58) Field of Classification Search
CPC ........... H04M 1/72522; H04M 1/2745; H04M 3/42059; H04M 19/04; H04M 1/7253; H04W 4/16
See application file for complete search history.

(56) References Cited

U.S. PATENT DOCUMENTS

| | | | |
|---|---|---|---|
| 8,948,821 | B2 | 2/2015 | Newham et al. |
| 9,247,525 | B2 | 1/2016 | Jacobs et al. |
| 9,565,539 | B2 | 2/2017 | Bamba et al. |
| 2009/0264116 | A1 | 10/2009 | Thompson |
| 2010/0210313 | A1 | 8/2010 | Huang et al. |
| 2012/0108215 | A1 | 5/2012 | Kameli |

(Continued)

FOREIGN PATENT DOCUMENTS

| | | |
|---|---|---|
| JP | 2002244980 A | 8/2002 |
| JP | 2002261967 A | 9/2002 |

(Continued)

OTHER PUBLICATIONS

Shiratori kei, the latest technology of "watches"; "Science of Children" (magazine), issued on Jun. 1, 2003, No. 66, No. 6, p. 4 to 11, Seibundo Shinkosha Publishing Co., Ltd.

(Continued)

*Primary Examiner* — Marcos L Torres
(74) *Attorney, Agent, or Firm* — Osha Liang LLP

(57) ABSTRACT

A contact person selecting interface is provided on a mobile terminal for a user. Using such an interface, the user can select one or more contact persons that are desired to transmit reminders. When receiving an incoming call or a new message, the mobile terminal determines whether a person sending the incoming call or the new message is selected by the user. If yes, the mobile terminal makes a wearable device give out a prompt message for remainder-ing the user. In such a way, it is convenient for the user to trace important calls or messages.

6 Claims, 11 Drawing Sheets

(56) References Cited

U.S. PATENT DOCUMENTS

| | | |
|---|---|---|
| 2014/0045547 A1 | 2/2014 | Singamsetty et al. |
| 2014/0357317 A1 | 12/2014 | Mullen |
| 2015/0134755 A1 | 5/2015 | Park |
| 2015/0207926 A1* | 7/2015 | Brown .............. H04M 1/72597 455/414.1 |
| 2015/0256987 A1 | 9/2015 | Bamba et al. |
| 2016/0065712 A1 | 3/2016 | Lhekov |
| 2016/0261299 A1 | 9/2016 | Hosoi et al. |
| 2016/0353407 A1* | 12/2016 | Hsu .................... H04W 4/02 |
| 2017/0086017 A1 | 3/2017 | Mercando et al. |
| 2018/0039232 A1* | 2/2018 | Abramov .............. G04B 47/00 |

FOREIGN PATENT DOCUMENTS

| | | |
|---|---|---|
| JP | 2004236214 A | 8/2004 |
| JP | 2007020084 A | 1/2007 |
| JP | 2008005134 A | 1/2008 |
| JP | 2010130183 A | 6/2010 |
| JP | 2015082818 A | 4/2015 |
| JP | 2015099974 A | 5/2015 |
| JP | 2015517757 A | 6/2015 |
| JP | 2015139132 A | 7/2015 |
| JP | 2016512671 A | 4/2016 |
| WO | 2014050996 A1 | 4/2014 |

OTHER PUBLICATIONS

Office Action issued in corresponding Japanese Application No. 2017-000137 dated Apr. 10, 2018, and English translation thereof (9 pages).

\* cited by examiner

US 10,257,335 B2

WRISTWATCH, MOBILE TERMINAL, AND COMMUNICATION REMINDING SYSTEM AND METHOD

TECHNICAL FIELD OF THE INVENTION

The present invention relates to a system and method carried out by cooperating a wearable device with a mobile terminal, and more particularly, to a wristwatch, a mobile terminal, and a communication reminding system and method.

BACKGROUND OF THE INVENTION

Nowadays, smartwatches cooperating with smartphones carry out an incoming call reminding function on the end of smartwatches. When receiving an incoming call or a new message, the smartphones inform the smartwatches to give out a prompt or a reminder for reminding a user to receive the incoming call or the new message. Although the existing skills provide the user such a convenience, sometimes troubles are instead caused to the user. The user may be interrupted when the prompts or the reminders of the phone calls or short messages from the smartwatches are too frequent. The existing incoming call or new message reminding function still has drawbacks for the user.

SUMMARY OF THE INVENTION

An objective of the present invention is to provide a wristwatch, a mobile terminal, and a communication reminding system and method, capable of filtering contact persons for reminders of incoming calls or new messages, thereby improving the user experience.

To achieve above objective, an aspect of the present invention provides a communication reminding system, comprising: a mobile terminal configured to provide a contact person selecting interface, the mobile terminal storing one or more contact persons selected by a user through the contact person selecting interface as a selected contact person data, the mobile terminal comparing a person sending an incoming call or a new message with the selected contact person data when receiving the incoming call or the new message from the person, and the mobile terminal transmitting a prompt requesting signal using wireless communication when the mobile terminal determines that the person sending the incoming call or the new message is contained in the selected contact person data; and a wearable device configured to provide a prompt message, the wearable device using the wireless communication to receive the prompt requesting signal transmitted from the mobile terminal, and giving out the prompt message according to the prompt requesting signal.

Another aspect of the present invention provides a mobile terminal, comprising: a display device; a contact person selecting interface a contact person list displayed on the display device, the contact person selecting interface being configured to be provided to a user to select one or more contact persons from the contact person list; a storage unit configured to store the one or more contact persons selected by the user through the contact person selecting interface as a selected contact person data; a comparison unit configured to compare a person sending an incoming call or a new message with the selected contact person data when the mobile terminal receives the incoming call or the new message from the person; a wireless signal transceiver configured to transmit a prompt requesting signal using wireless communication when the comparison unit determines that the person sending the incoming call or the new message is contained in the selected contact person data.

Still another aspect of the present invention provides a wristwatch, having a dial, at least one physical indicator, and a movement, the dial having physical scales disposed thereon, the at least one physical indicator being disposed above the dial, the at least one physical indicator being driven by the movement and cooperating with the physical scales on the dial to show the time, the wristwatch further comprising a functional module, which at least comprising: a wireless communication module receiving a prompt requesting signal; a processor unit receiving the prompt requesting signal from the wireless communication module and generating a control instruction according to the prompt requesting signal; and a prompting device controlled by the control instruction of the processor unit, the prompting device giving out a prompt message when receiving the control instruction, wherein the wireless communication module receives the prompt requesting signal generated by a mobile terminal according to a source type of the incoming call or the new message, and the prompting device produces different prompt messages according to different prompt requesting signals.

Still another aspect of the present invention provides a communication reminding method, comprising steps of: storing one or more contact persons selected by a user through a contact person selecting interface as a selected contact person data; comparing a person sending an incoming call or a new message with the selected contact person data when receiving the incoming call or the new message from the person; transmitting a prompt requesting signal using wireless communication when the person sending the incoming call or the new message is contained in the selected contact person data; and giving out a prompt message according to the prompt requesting signal.

In the present invention, the mobile terminal is cooperated with the wearable device (e.g., a wristwatch or a wristband). The mobile terminal provides a contact person selecting interface for a user. By using such an interface, the user selects one or more contact persons that are desired to transmit reminders. When receiving an incoming call or a new message, the mobile terminal determines whether a person sending the incoming call or the new message is selected by the user. If yes, the mobile terminal makes the wearable device give out a prompt message for remaindering the user. In the present invention, the user can filter contact persons to receive reminders for the incoming calls or the new messages. In such a way, it is convenient for the user to trace important calls or messages. This improves the user experience. In another aspect, the user can also select different ways of reminding for the phone calls, short messages, or the reminders from communication or social network software. It is convenient for the user to handle various social network communications.

DETAILED DESCRIPTION OF THE INVENTION

To make the objectives, technical schemes, and technical effects of the present invention more clearly and definitely, the present invention will be described in details below by using embodiments in conjunction with the appending drawings. It should be understood that the specific embodiments described herein are merely for explaining the present invention, and as used herein, the term "embodiment" refers to an instance, an example, or an illustration but is not intended to limit the present invention. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

The present invention relates to a wristwatch, a mobile terminal, and a communication reminding system and method. When receiving an incoming call or a new message, the mobile terminal makes the wristwatch give out a prompt message. Particularly, the incoming calls or new messages received by the mobile terminal are filtered. A user can select some contact persons he/she wants to be reminded. When an incoming call or a mew message is consistent with a contact persons pre-selected by the user, the mobile terminal informs the wristwatch to give out the prompt message.

For the aspect of wristwatch, the following paragraphs are described with an application of the present invention as an example, that is, quartz watches. However, for a person skilled in the art, it can be understood that the concepts of the present invention are also applicable to traditional mechanical watches, electronic watches, or other types of traditional watches, and can also be applied to smartwatches, smartbands or other similar wearable devices. For the aspect of mobile terminal, the mobile terminal may be implemented by smartphones, tablet computers, or other portable devices equipped with a communication function.

Figure 1:
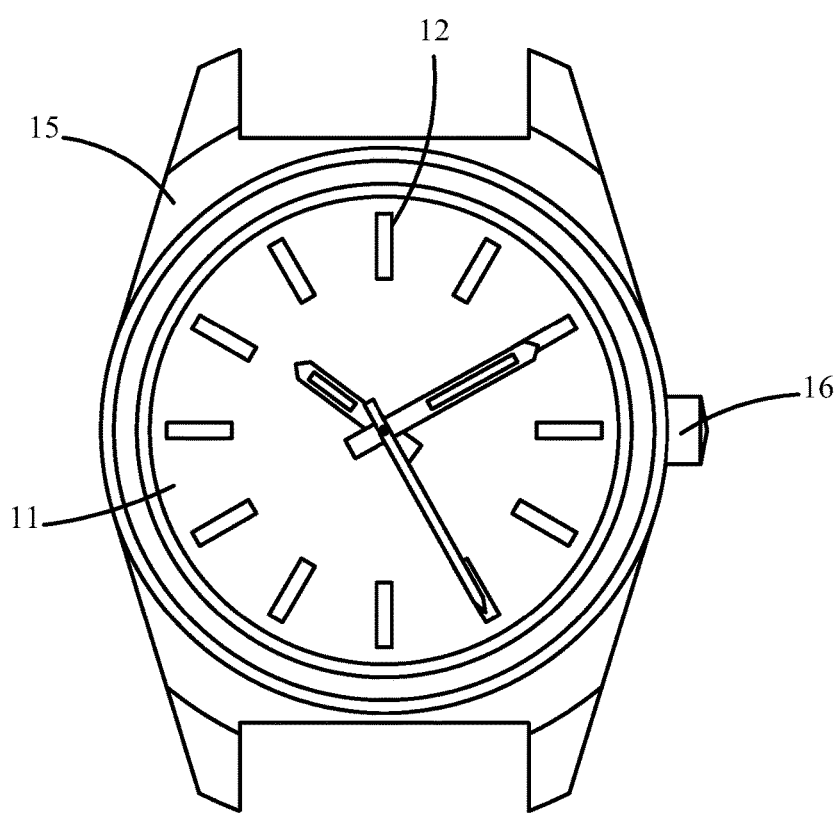
FIG. 1 is a top view of a wristwatch in accordance with an embodiment of the present invention.
Figure 2:
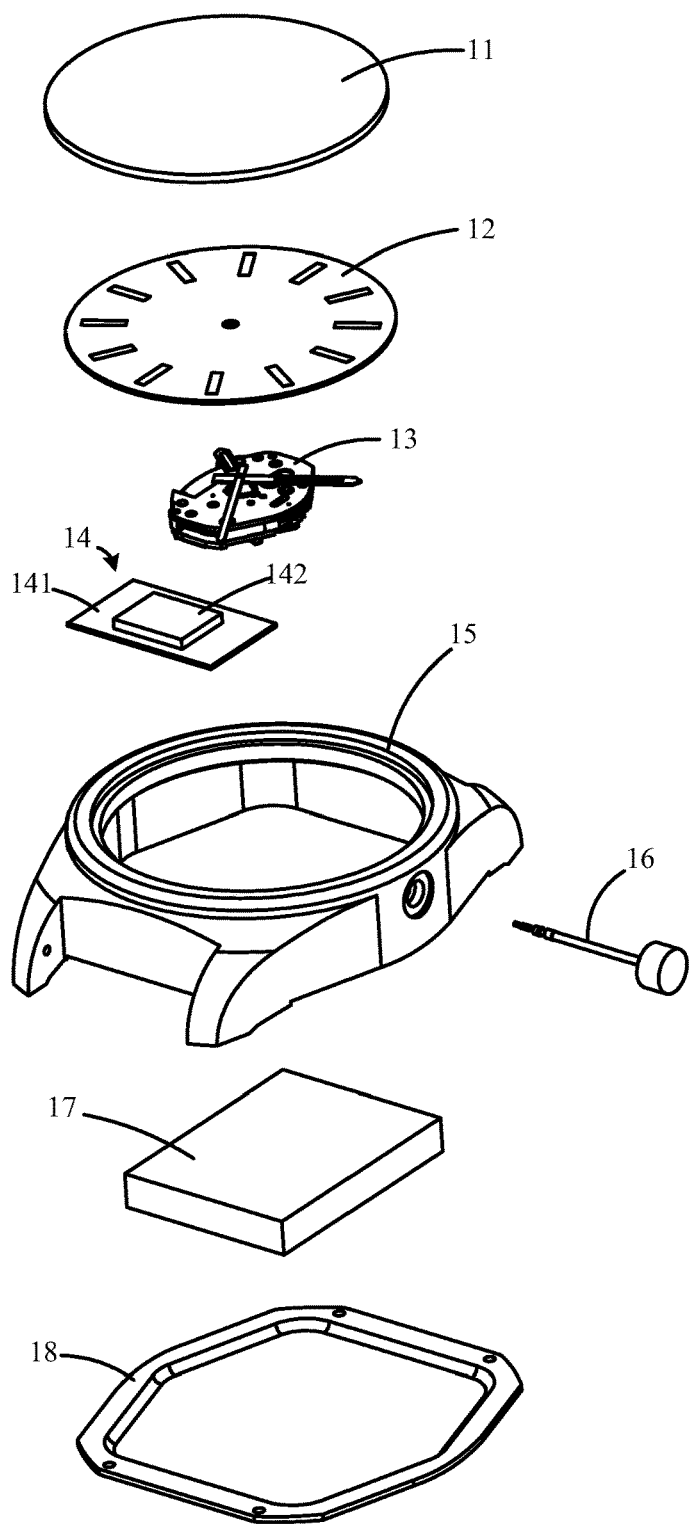
FIG. 2 is an exploded view of the wristwatch shown in FIG. 1.
Figure 3:
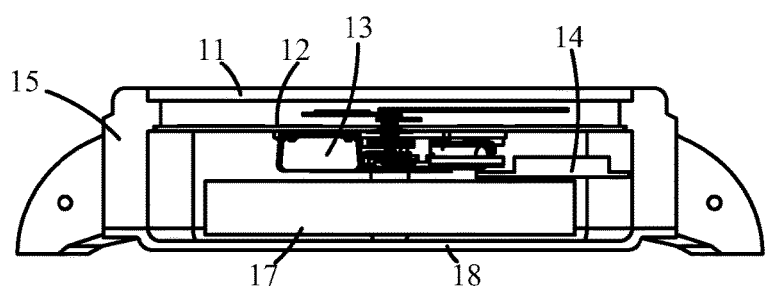
FIG. 3 is a sectional view of the wristwatch shown in FIG. 2.

Please refer to FIG. 1, FIG. 2, and FIG. 3. FIG. 1 is a top view of a wristwatch in accordance with an embodiment of the present invention. FIG. 2 is an exploded view of the wristwatch shown in FIG. 1. FIG. 3 is a sectional view of the wristwatch shown in FIG. 2. The wristwatch in accordance with the embodiment of the present invention comprises a glass 11, a dial 12, a movement 13, a functional module 14, a watch case 15, a crown 16, a battery 17, and a bottom case 18. The glass 11 is made of a transparent material (i.e., glass material). The dial 12 has physical scales (e.g., one o'clock to twelve o'clock) disposed thereon. Indicators (e.g., physical hands including a hour hand, a minute hand, and a second hand) are arranged above the dial 12. The indicators are driven by the movement 13 and cooperates with the scales on the dial 12 to show the time. Through the transparent glass 11, a user can perceive the position information (i.e., time information) indicated by the indicators. The watch case 15 and the bottom case 18 are used to protect the mechanical structures and/or electronic devices inside the wristwatch. The watch case 15, the bottom case 18, and the dial 12 (or the glass 11) construct an accommodating space for accommodating the movement 13, the functional module 14 and the battery 17. Also, the wristwatch has the crown 16 disposed at the lateral side thereof. The user can adjust the correct time or set an alarm by turning a knob on the crown 16. The battery 17 can provide the power required by the movement 13 and/or the functional module 14. In this embodiment, the functional module 14 is arranged in the accommodating space of the wristwatch. However, in other embodiments, the functional module 14 may also be disposed at other positions of the wristwatch, for example, a strap of the wristwatch. The functional module 14 cooperates with the mobile terminal for providing a user with a reminding function for the incoming calls or the new messages.

As can be seen from FIG. 1 to FIG. 3 of the present invention, even though there may have a slight difference in design, the functions of the glass 11, the dial 12, the movement 13, the watch case 15, the crown 16, the battery 17, and the bottom case 18 are similar to that of a traditional wristwatch, especially corresponding to the framework of a quartz watch. However, distinguished from the conventional skills, the wristwatch in accordance with the embodiment of the present invention comprises the functional module 14. That is to say, remaining room in a traditional quartz watch can be reused to equip such a functional module 14 or the quartz watch can be improved to accommodate such a functional module 14, thereby carrying out prompting for a receipt of an incoming call or a new message through cooperation with the mobile terminal. In such a manner, the traditional wristwatch becomes intelligent. Similarly, the functional module 14 of the present invention can also be deployed in a mechanical watch, an electronic watch, or other types of traditional watches such that they have intelligent functions. Such a concept is similar to the example of quartz watch, and is not detailed herein.

In the embodiment of the present invention, the battery 17 can supply power to the movement 13 and the functional module 14. That is, the movement 13 and the functional module 14 (and the other electronic devices inside the wristwatch) can concurrently use the electric power stored in the battery 17. In other embodiments, the movement 13 and the functional module 14 may have individual batteries and power supply systems. That is, the movement 13 and the functional module 14 can be supplied by different batteries.

Figure 4:
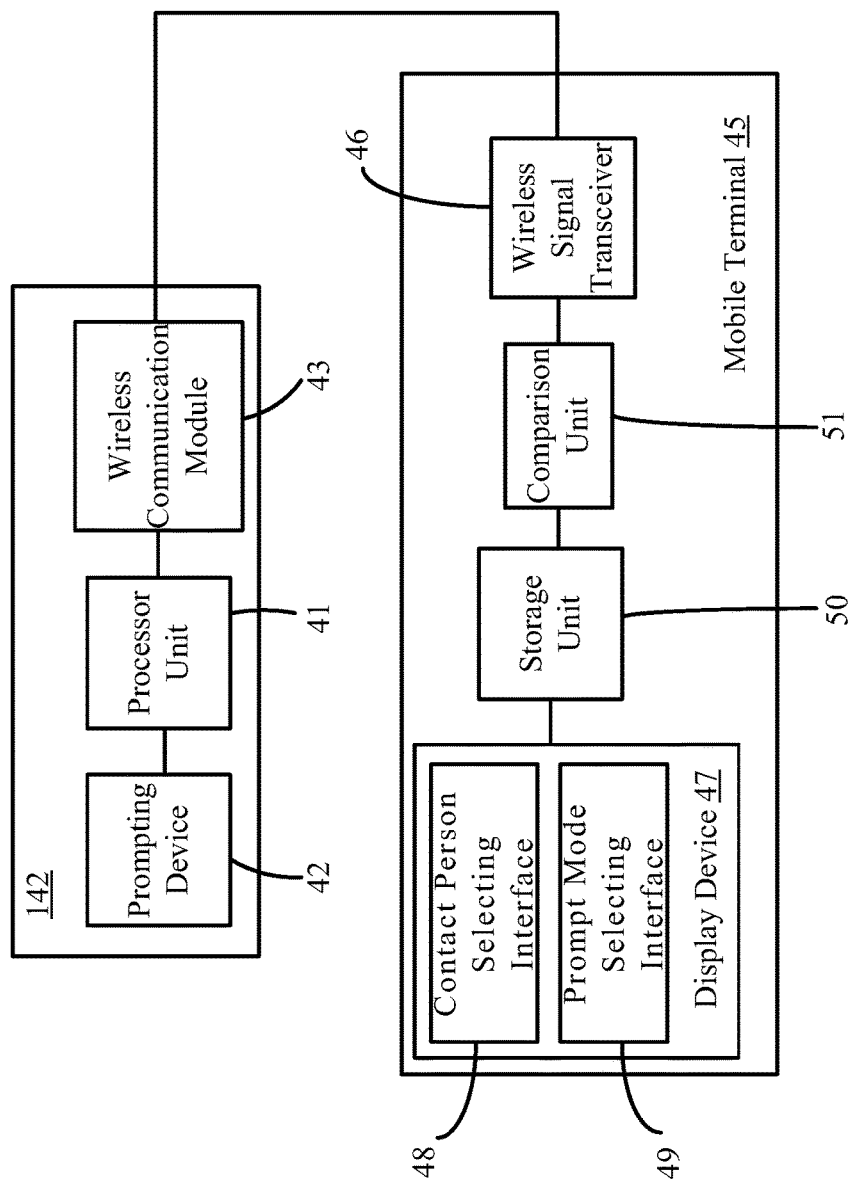
FIG. 4 is a schematic diagram showing a communication framework of a functional module and a mobile terminal in accordance with the present invention.

As shown in FIG. 2, the functional module 14 comprises an electronical connecting substrate 141 and a packaging body 142 disposed on the electronical connecting substrate 141. FIG. 4 is a schematic diagram showing a communication framework of a functional module 14 and a mobile terminal 45 in accordance with the present invention. Please refer to FIG. 4 in conjunction with FIGS. 1 to 3. The packaging body 142 of the functional module 14 of the present invention has a processor unit 41, a prompting device 42, and a wireless communication module 43 deployed therein. The processor unit 41, the prompting device 42, and the wireless communication module 43 can be packaged into a monolithic packaging structure, such as a SiP (System in Package) structure, on the electronical connecting substrate 141, and can also be individually packaged or any two of them are integrated into one package, and then electronic signal transmission is accomplished by layout structure on a same or different electronical connecting substrates. The electronical connecting substrate 141 can be implemented by a flexible multi-layer substrate or a rigid one, which has a plurality of metal layers and a plurality of dielectric layers. The metal layers are distributed between the respective dielectric layers and are used to transmit electronic signals. The material of the dielectric layers may be polyimide and the dielectric layers may be formed by spin coating. The mobile terminal 45 has a wireless signal transceiver 46 for receiving and transmitting wireless signals. For example, the wireless signal transceiver 46 may be implemented by a bluetooth transceiver or a NFC (Near Field Communication) transceiver.

The wireless communication module 43 of the functional module 14 is a communication module (such as a bluetooth communication module or a NFC communication module) able to communication with the wireless signal transceiver 46 of the mobile terminal 45. The prompting device 42 of the functional module 14 is configured to give out a prompt message for a user. The prompt message may be in form of a vibration, a light ray, or a sound. For instance, the prompting device 42 may include a vibration motor, which can generate a long vibration, a short vibration, or any type of vibration, or their combinations. The prompting device 42 may also include a light emitting diode (LED), which can emit light rays for reminding the user. The prompting device 42 may also include a sound wave generating device (e.g., a speaker), which can make a sound for reminding the user. The prompting device 42 can also give out the prompt message in a form of an arbitrary combination of vibration, light, and sound.

Please refer to FIG. 4 in conjunction with FIGS. 1 to 3. The communication reminding system may include a mobile terminal 45 and a wearable device (e.g., the afore-mentioned wristwatch, a wristband having the aforesaid functional module 14, or other smartbands having similar or the same functions). Specifically, a communication reminding function of the present invention can be carried out by the mobile terminal 45 and the functional module 14 of the wristwatch, for example. The mobile terminal 45 includes the wireless signal transceiver 46, a display device 47, a storage unit 50, and a comparison unit 51. The display device 47 can display a contact person selecting interface 48 and a prompt mode selecting interface 49. The communication reminding function of the present invention is detailed below.

Figure 5:
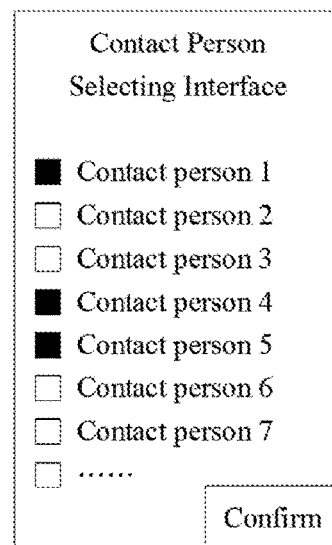
FIG. 5 is a schematic diagram showing an example of a contact person selecting interface according to the present invention.

The mobile terminal 45 provides the contact person selecting interface 48, as shown in FIG. 5. Using the contact person selecting interface 48, a user can select one or more contact persons that are desired to transmit reminders. The mobile terminal 45 stores the contact persons selected by the user through the contact person selecting interface 48 as a selected contact person data, which is saved in the storage unit 50. The selected contact person data contains one or more contact persons set by the user. The contact person selecting interface 48 can be provided to the user by an installed application program (APP) in the mobile terminal. For instance, as shown in FIG. 5, the contact person selecting interface 48 lists all the contact persons. The user can select/deselect a contact person from the list by clicking the contact person on the list. Such a contact person list can be from a phone book of a cell phone, and it can also be from a communication software or a social network software. That is, the user can filter the contact persons for incoming call reminders or short message reminders, and can also filter the contact persons from the communication software and the social network software.

When receiving an incoming call or a new message, the mobile terminal 45 compares a person sending the incoming call or the new message with the selected contact person data using the comparison unit 51. When the comparison unit 51 determines that the person is contained in the selected contact person data, the mobile terminal 45 transmits a prompt requesting signal by using wireless communication through the wireless signal transceiver 46. The aforesaid incoming call or new message can be a cell phone call or a short message, or a call or a message of the communication software or the social network software, and the content is not limited to be in a form of a text, a sound, or an image. During the comparison, it is not limited to compare the name of the person sending the incoming call or the new message with the names of contact persons contained in the selected contact person data. Other specific data can also be used for the comparison, for example, a phone number.

The wearable device (or the wristwatch) is configured to provide a prompt message. When receiving the prompt requesting signal from the mobile terminal 45, the wearable device gives out the prompt message. The prompt requesting signal can be encoded/decoded based on a manner the mobile terminal 45 engages with the wearable device such that the wearable device can recognize the prompt requesting signal transmitted by the mobile terminal 45, and perform a preset action after receiving the prompt requesting signal.

For the afore-mentioned functional module 14 of the wristwatch, it can use the wireless communication module 43 to communicate with the wireless signal transceiver 46 of the mobile terminal 45 so as to receive the prompt requesting signal from the mobile terminal 45. The processor unit 41 is coupled to the wireless communication module 43 for receiving the prompt requesting signal transmitted from the wireless communication module 43, and generating a control instruction based on the received prompt requesting signal. The prompting device 42 is controlled by the control instruction of the processor unit 41. When receiving the control instruction, the prompting device 42 gives out the prompt message.

Figure 6:
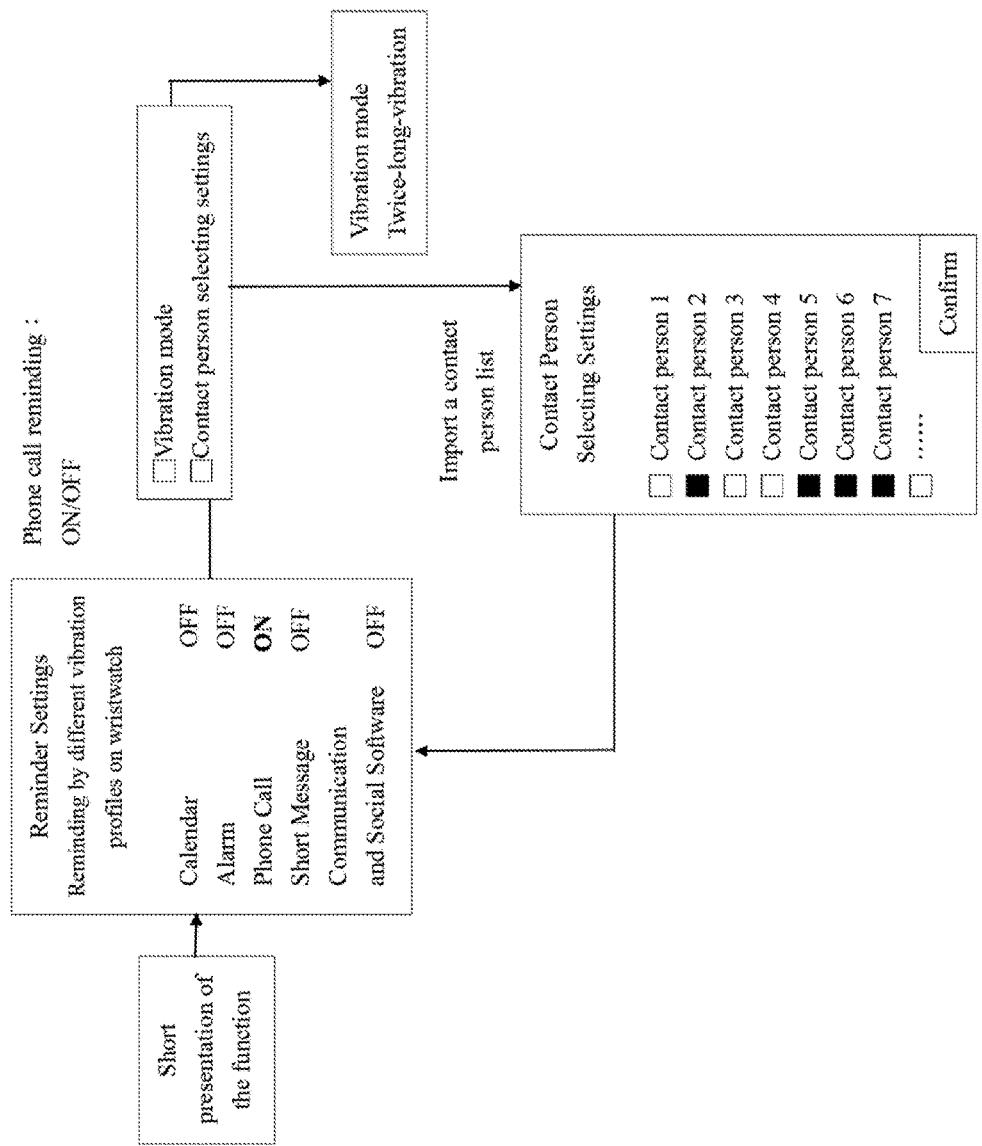
FIG. 6 is a schematic diagram showing an example of a setting interface for filtering phone call reminders according to the present invention.
Figure 7:
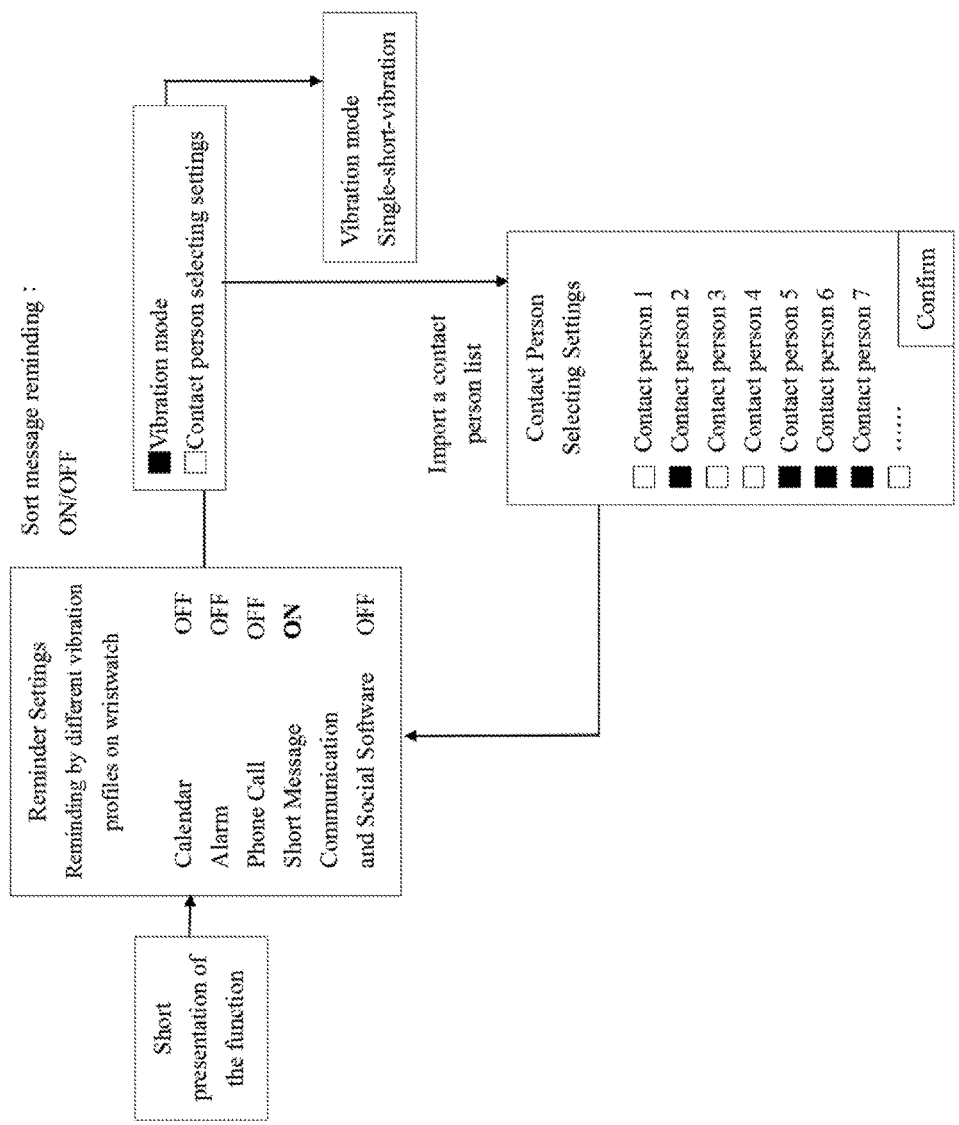
FIG. 7 is a schematic diagram showing an example of a setting interface for filtering short message reminders.

Please refer to FIG. 6, which is a schematic diagram showing an example of a setting interface for filtering phone call reminders according to the present invention. This setting interface can be provided by an application program (APP) installed on the mobile terminal 45, and is displayed on the display device 47 (shown in FIG. 4) of the mobile terminal 45. As shown in FIG. 6, a user can switch on or off the phone call reminding function, and select the contact persons that are desired to transmit reminders from a contact person list by using "contact person filtering settings". When an incoming call is from a contact person selected by the user, the wearable device (or the functional module 14 of the wristwatch or the wristband) will give out the prompt message. Through this interface, the user can also select an expression form for the prompt message. For example, when an incoming call is from a contact person selected by the user, the prompting device 42 vibrates twice. FIG. 7 is a schematic diagram showing an example of a setting interface for filtering short message reminders. Except that the short message reminder filtering function is for short message filtering for the short messages received by the user, the short message reminder filtering function is similar to the phone call reminder filtering function, and thus is not further detailed herein.

Figure 8A:
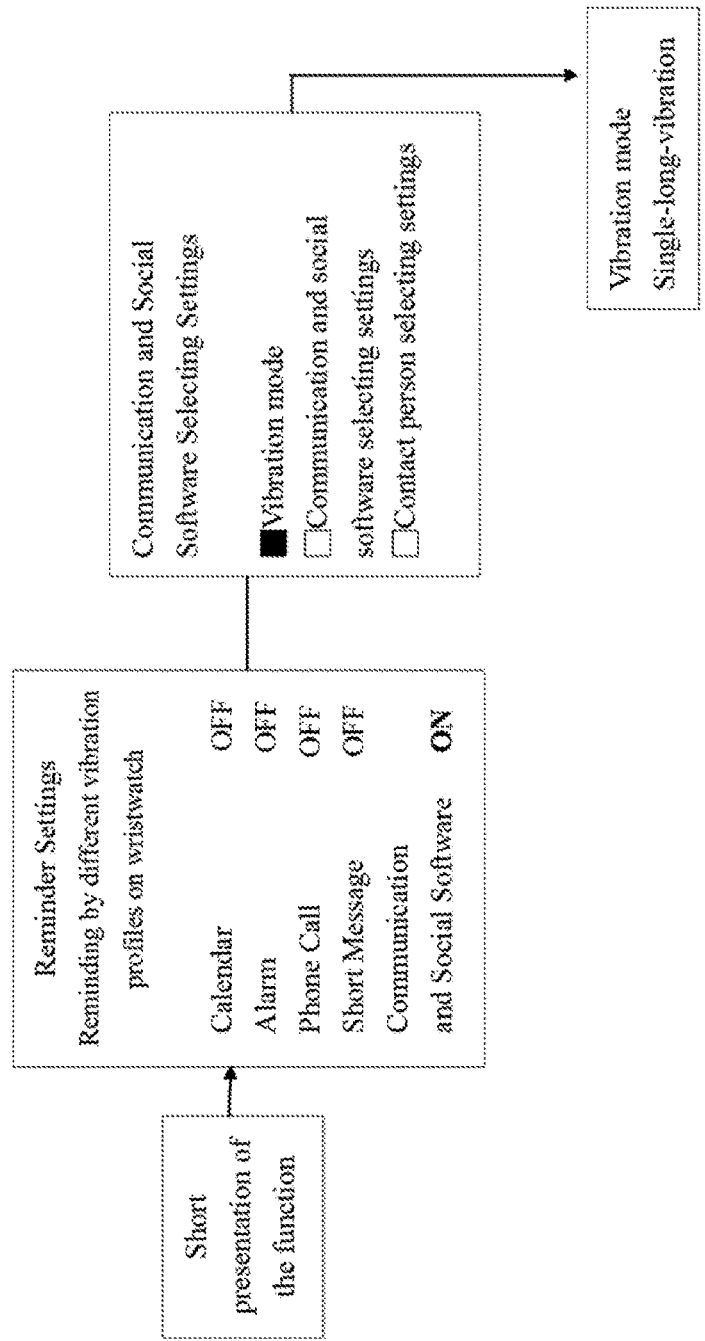
FIGS. 8A to 8C are schematic diagrams showing an example of a setting interface for filtering reminders from a communication software or a social network software.
Figure 8B:
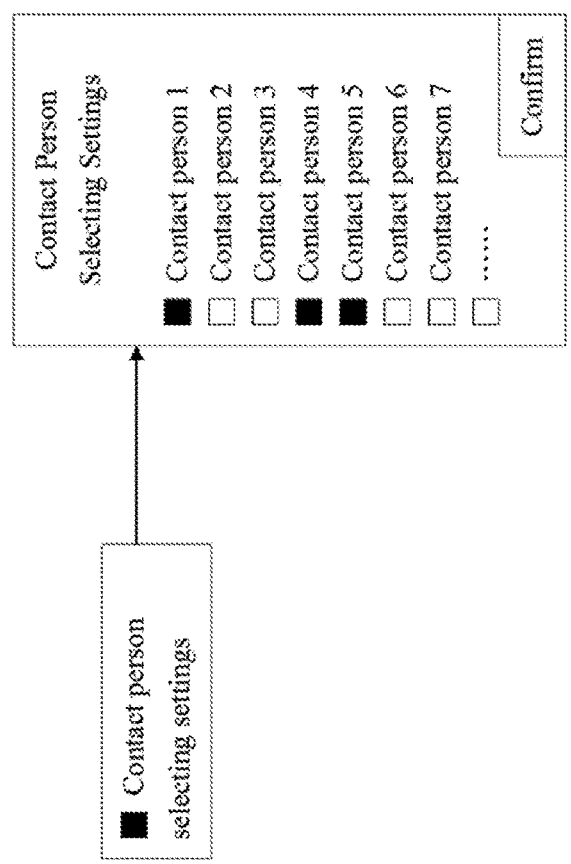
Figure 8C:
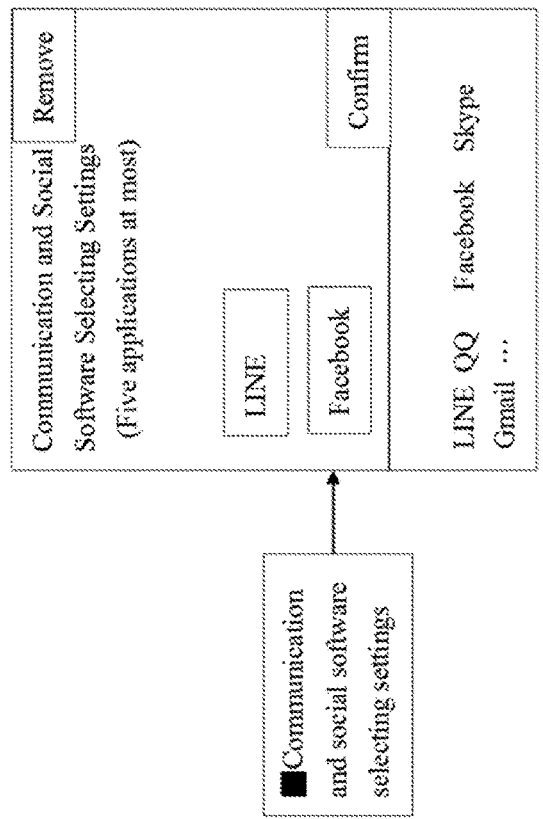

Please refer to FIGS. 8A to 8C, which are schematic diagrams showing an example of a setting interface for filtering reminders from a communication software or a social network software. In this interface, by using "communication and social network software filtering settings" a user can select one or more types of communication or social network software that are desired to transmit reminders. For example, as shown in FIG. 8C, the user can drag a desired software from a communication and social network software list to a selection region. A software dragged to the selection region means that the software is selected. FIG. 8C shows that LINE and FACEBOOK are selected by the user. The user can also remove a selected software by dragging it to a remove option region. The selected communication or social network software means that a prompt or a reminder of an incoming call or a new message will be transmitted for this software. By using "contact person filtering settings", the user can also filtering the contact persons from each selected communication or social network software, which is similar to the filtering performed to the contact persons of a phone book, and is not further detailed herein.

The user can set different prompt messages (by using the prompt mode selecting interface 49) for the prompts or reminders of the phone calls, the short messages, or from the communication or social network software. That is, the expression forms of the prompt messages are different. For instant, a twice-long-vibration may be adopted for a phone call reminder, a single-short-vibration may be adopted for a short message reminder, and a single-long-vibration may be adopted for a reminder from the communication or social network software. In this way, when perceiving different prompt messages, the user can know the reminder is from a phone call, a short message, or communication or social network software. This improves the user experience.

In this part, the mobile terminal 45 further determines a source type of an incoming call or a new message, and generates difference prompt requesting signals according to difference source types such that the wearable device (or the prompting device 42 of the functional module 14 of the wristwatch) produces different prompt messages. Different types of communication or social network software can be deemed as a same type, and can also be deemed as different source types (for example, LINE and FACEBOOK are two different source types). The principle for this determination can be set by the user itself or the user can classify the source types by itself.

Figure 9:
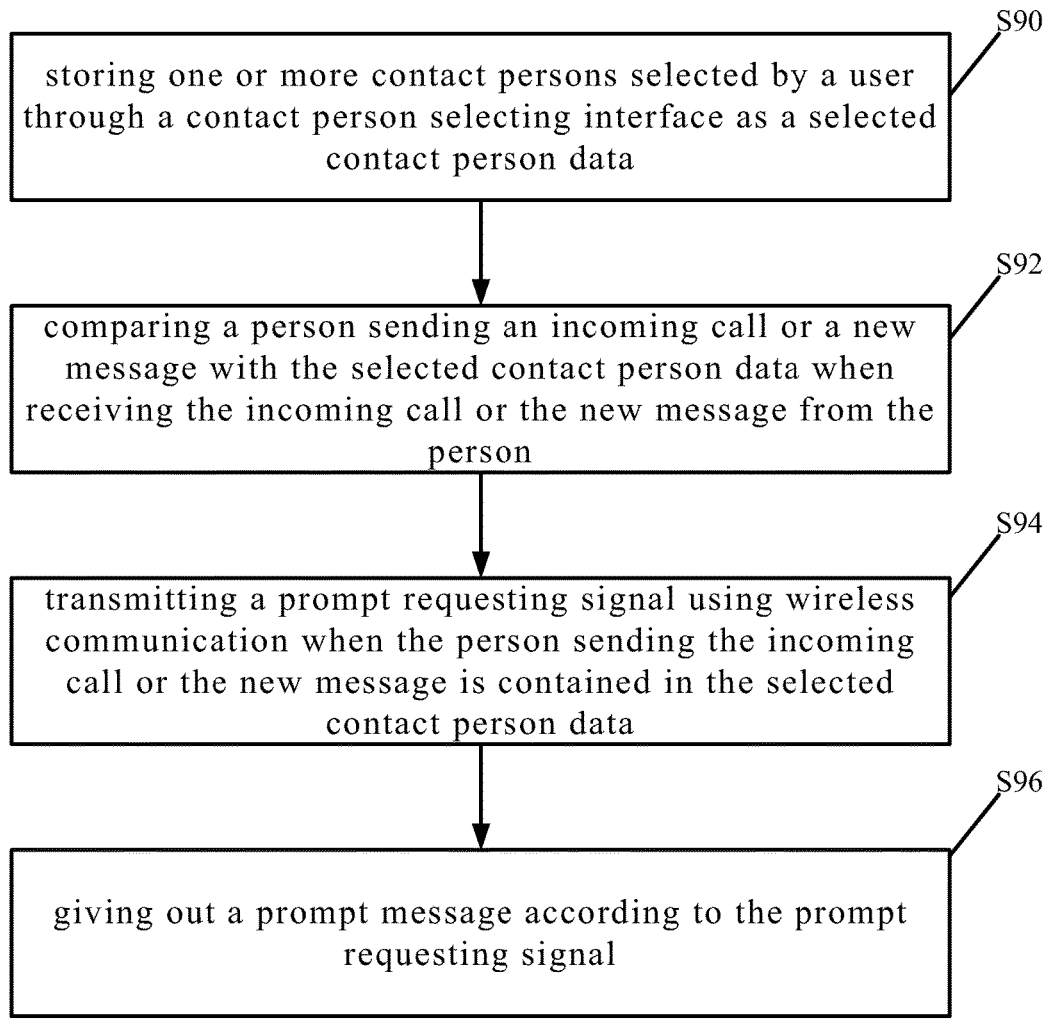
FIG. 9 is a flow chart of a communication reminding method in accordance with the present invention.

Please refer to FIG. 9 in conjunction with FIGS. 1 to 4. Respective processes of a communication reminding method provided in the present invention will be described below with reference to above contents.

In Step S90, storing one or more contact persons selected by a user through a contact person selecting interface 48 displayed on a display device 47 of a mobile terminal 45 as a selected contact person data. Using the contact person selecting interface 48, the user can select one or more contact persons that are desired to transmit reminders. The mobile terminal 45 stores the contact persons selected by the user as the selected contact person data, which is saved in the storage unit 50.

In Step S92, comparing a person sending an incoming call or a new message with the selected contact person data stored in Step S90 when the mobile terminal 45 receives the incoming call or the new message from the person. This step is executed by the comparison unit 51 of the mobile terminal 45.

In Step S94, transmitting a prompt requesting signal using wireless communication when the person sending the incoming call or the new message is contained in the selected contact person data. Specifically, the mobile terminal 45 transmits the prompt requesting signal to a wearable device by using the wireless communication through the wireless signal transceiver 46.

In Step S96, giving out, by a wearable device, a prompt message according to the prompt requesting signal. Specifically, the wearable device also includes a wireless signal transceiver, which can receive the prompt requesting signal transmitted from the mobile terminal 45. The wearable device also includes a prompting device, which can give out the prompt message (e.g., a vibration) according to the prompt requesting signal.

In the present invention, the mobile terminal is cooperated with the wearable device (e.g., a wristwatch or a wristband). The mobile terminal provides a contact person selecting interface for a user. By using such an interface, the user selects one or more contact persons that are desired to transmit reminders. When receiving an incoming call or a new message, the mobile terminal determines whether a person sending the incoming call or the new message is selected by the user. If yes, the mobile terminal makes the wearable device give out a prompt message for remaindering the user. In the present invention, the user can filter contact persons to receive reminders for the incoming calls or the new messages. In such a way, it is convenient for the user to trace important calls or messages. This improves the user experience. In another aspect, the user can also select different ways of reminding for the phone calls, short messages, or the reminders from communication or social network software. It is convenient for the user to handle various social network communications.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A communication reminding system, comprising:
   a mobile terminal, comprising:
      a display device;
      a contact person selecting interface providing a contact person list displayed on the display device, the contact person selecting interface configured to be provided to select one or more contact persons from the contact person list;
      a storage unit configured to store the one or more contact persons selected through the contact person selecting interface as a selected contact person data;
      a comparison unit configured to compare an entity with the selected contact person data when an incoming call or a new message is received from the entity; and
      a wireless signal transceiver configured to transmit a prompt requesting signal using wireless communication when the comparison unit determines that the entity sending the incoming call or the new message is contained in the selected contact person data; and
   a wristwatch, having a dial, at least one physical indicator, and a movement, the dial having physical scales disposed thereon, the at least one physical indicator disposed above the dial, the at least one physical indicator driven by the movement and cooperating with the physical scales on the dial to show the time, the wristwatch further comprising a functional module comprising an electronical connecting substrate and a packaging body disposed on the electronical connecting substrate, the functional module at least comprising:
- a wireless communication module communicating with the wireless signal transceiver of the mobile terminal using the wireless communication to receive the prompt requesting signal transmitted from the mobile terminal;
- a processor unit receiving the prompt requesting signal from the wireless communication module and generating a control instruction according to the prompt requesting signal; and
- a prompting device controlled by the control instruction of the processor unit, configured to give out the prompt message when receiving the control instruction, wherein the wireless communication module, the processor unit, and the prompting device are packaged into the packaging body as a monolithic packaging structure on the electronical connecting substrate.

2. The communication reminding system according to claim 1, wherein the mobile terminal further comprises:
- a prompt mode selecting interface displayed on the display device, configured to be provided to select a prompt mode.

3. The communication reminding system according to claim 1,
wherein the mobile terminal further determines a source type of the incoming call or the new message and generates different prompt requesting signals for different source types, and the prompt message generated by the wristwatch is based on the prompt requesting signal.

4. The communication reminding system according to claim 1, wherein the prompt message comprising a vibration prompt message.

5. The communication reminding system according to claim 1, wherein the monolithic packaging structure is a System in Package (SIP) structure.

6. The communication reminding system according to claim 1, wherein the electronical connecting substrate comprises a multi-layer substrate having a plurality of metal layers and a plurality of dielectric layers, the metal layers distributed between the dielectric layers and configured to transmit electronic signals.

* * * * *